United States Patent
Fujiyama (10) Patent No.: US 6,839,811 B2
(45) Date of Patent: Jan. 4, 2005

(54) SEMAPHORE MANAGEMENT CIRCUIT (75) Inventor: Hiroyuki Fujiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 10/092,306

(22) Filed: Mar. 7, 2002

(65) Prior Publication Data
US 2003/0033489 A1 Feb. 13, 2003

(30) Foreign Application Priority Data
Aug. 7, 2001  (JP) ........................................ 2001-239513

(51) Int. Cl.⁷ ............................................ G06F 12/00
(52) U.S. Cl. .................. 711/141; 711/145; 711/147; 711/151; 711/152; 711/155; 711/163; 710/200; 710/220; 710/240; 709/207; 709/217

(58) Field of Search ................................. 711/141, 145, 711/147, 151, 152, 155, 163; 710/200, 220, 240; 709/207, 217

(56) References Cited

U.S. PATENT DOCUMENTS

| 5,430,860 A | * | 7/1995 | Capps et al. ................. 711/155 |
| 5,889,983 A | * | 3/1999 | Mittal et al. ................. 712/223 |
| 5,920,714 A | * | 7/1999 | Schiffleger ................... 712/241 |

* cited by examiner

Primary Examiner—Donald Sparks
Assistant Examiner—Bao Q Truong
(74) Attorney, Agent, or Firm—Staas & Halsey LLP (57) ABSTRACT A circuit includes a register which stores therein a semaphore address, and further includes a semaphore control circuit which asserts a control signal in response to a read access by a processor directed to the semaphore address, and negates the control signal in response to a write access by the processor directed to the semaphore address.

8 Claims, 6 Drawing Sheets

SEMAPHORE MANAGEMENT CIRCUIT

BACKGROUND OF THE INVENTION

1. Field of the Invention

The present invention generally relates to circuits for controlling memory access and processors and systems using such circuits, and particularly relates to a circuit for controlling a semaphore and a processor and system using such a circuit.

2. Description of the Related Art

In a system comprised of a plurality of processors, resources such as memories connected to a common bus are shared by the plurality of processors. When a given processor needs to use a memory, the processor may exclusively use the memory for a certain period of time. During such a time period, other processors are not allowed to access the memory. Such provision has to be made because system consistency cannot be maintained if memory access or data updating is performed by another processor during an ongoing transaction. In order to make exclusive use of shared resources, resource management based on use of semaphore registers is typically employed.

In the resource management based on the use of semaphore registers, a processor in need of exclusive use of a memory refers to a semaphore flag prior to accessing the memory. If the flag is not set, it is ascertained that other processors are not using the memory. In such a case, the processor sets the flag to explicitly indicate to other processors that the memory is going to be exclusively used, and then accesses the memory. During a time period in which the flag is in a set state, other processors cannot access the memory. After finishing the use of the memory, the processor that has been using the memory resets the semaphore flag.

In use of semaphore flags, it is necessary to implement strict flag management. Consideration is now given to a situation in which a processor refers to a semaphore flag and determines that the flag is not in a set state, followed by performing a flag setting operation to set the flag. If there is a time gap from the checking of the flag to the setting of the flag, another processor may refer to the semaphore flag during this time gap. In such a case, the processor that later referred to the semaphore flag ascertains that the memory is available because of the unset state of the flag.

In order to avoid such a situation, an access scheme called a read-modify-write access or an atomic-LOAD/STORE access is employed in referring to and setting a semaphore flag. In this access scheme, a read operation and a write operation are performed within a single bus cycle that is an indivisible unit of operation. Since a read operation and a write operation are performed within a single bus cycle to refer and set a flag, strict flag management becomes possible. In general, a processor that is designed for use in a multi-processor-system environment is equipped with the atomic-LOAD/STORE function as an access function.

General processors that are not specially designed for use in a multi-processor-system environment are not provided with such an atomic-LOAD/STORE function. In order to implement a multi-processor system by use of such general processors, certain consideration must be made in one way or another to provide the same or similar function as the atomic-LOAD/STORE function.

Accordingly, there is a need for a circuit that provides a function similar to the atomic-LOAD/STORE function when a multi-processor system is implemented by use of processors having no atomic-LOAD/STORE function. Further, there is a need for a processor and a multi-processor system that are provided with such a circuit.

SUMMARY OF THE INVENTION

It is a general object of the present invention to provide a circuit, a processor, and a multi-processor system that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a circuit, a processor, and a multi-processor system particularly pointed out in the specification in such full, clear, concise, and exact terms as to enable a person having ordinary skill in the art to practice the invention.

To achieve these and other advantages and in accordance with the purpose of the invention, as embodied and broadly described herein, a circuit according to the present invention includes a register which stores therein a semaphore address, and a semaphore control circuit which asserts a control signal in response to a read access by a processor directed to the semaphore address, and negates the control signal in response to a write access by the processor directed to the semaphore address.

In detail, the circuit as described above further includes a comparator which makes a comparison of an address output from the processor with the semaphore address stored in the register, and asserts a match signal when the comparison indicates a match, wherein the semaphore control circuit includes a circuit which sets the control signal to an asserted state in response to assertion of the match signal and an indication of a read operation by a read/write signal output from the processor, and a circuit which resets the control signal to a negated state in response to the assertion of the match signal and an indication of a write operation by the read/write signal output from the processor.

In the circuit described above, address signals output from the processor are compared with the semaphore address. If these addresses match, the circuit sets the control signal to HIGH at the time of a read operation (load operation) directed to the semaphore, and resets the control signal to LOW at the time of a write operation (store operation) directed to the semaphore. This control signal informs other processors that the bus access made by the processor is a bus access for semaphore control. The other processors refrain from accessing the semaphore if the control signal indicates that there is an ongoing access operation directed to the semaphore.

According to another aspect of the present invention, a processor of the invention includes a processor core, a register which stores therein a semaphore address, and a control circuit which asserts a control signal in response to a read access by the processor core directed to the semaphore address, and negates the control signal in response to a write access by the processor core directed to the semaphore address.

According to another aspect of the present invention, a multi-processor system of the invention includes a plurality of processors, a memory shared by the plurality of processors, and a semaphore register for controlling exclusive use of the memory, wherein at least one of the plurality of processors includes a processor core, an address register which stores therein an address of the semaphore register, and a control circuit which asserts a control signal in response to a read access by the processor core directed to the address stored in the address register, and negates the control signal in response to a write access by the processor core directed to the address stored in the address resister.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
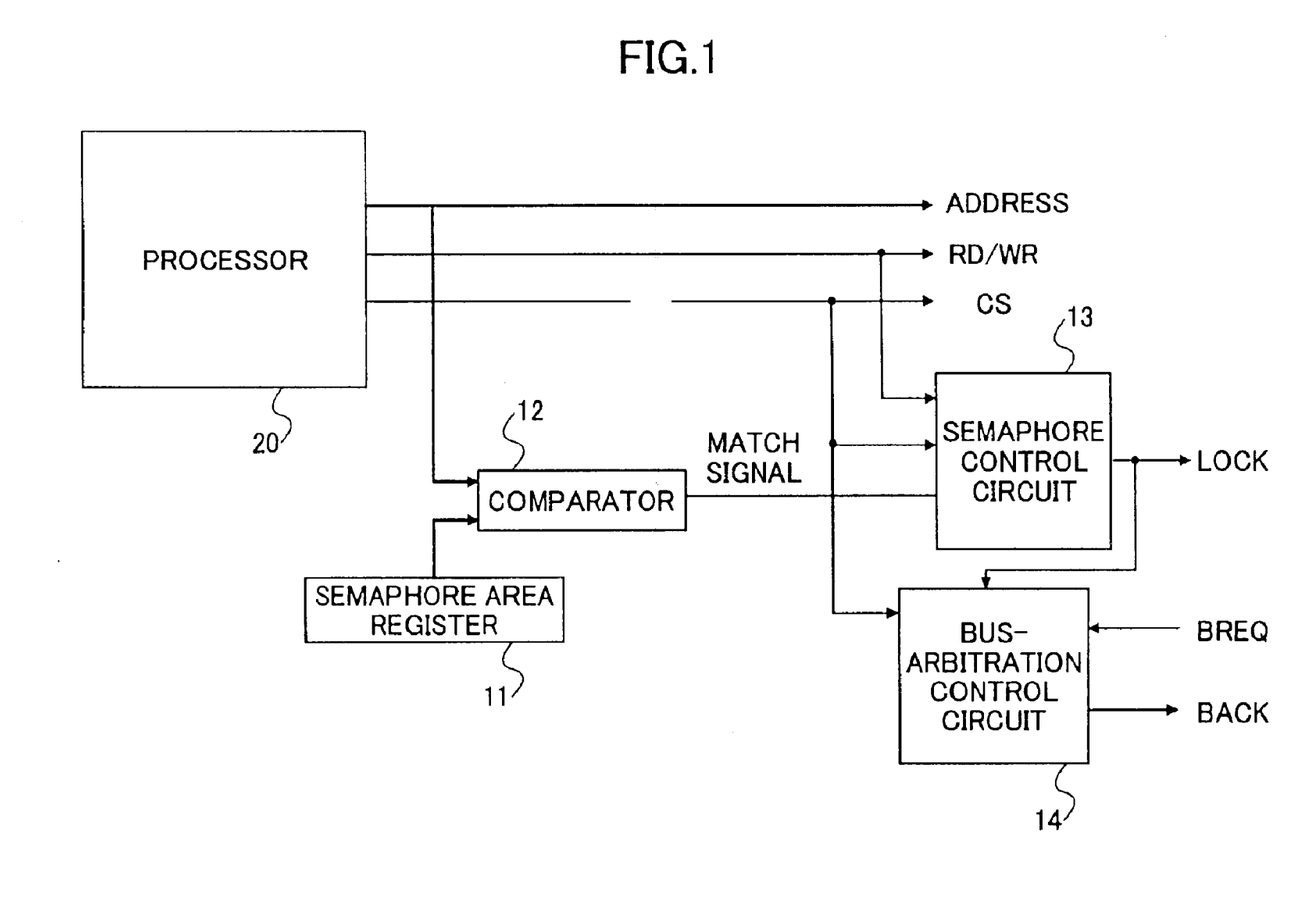
FIG. 1 is a block diagram showing a semaphore management circuit according to the present invention.

FIG. 1 is a block diagram showing a semaphore management circuit according to the present invention.

The semaphore management circuit of FIG. 1 includes a semaphore area register 11, a comparator 12, a semaphore control circuit 13, and a bus-arbitration control circuit 14. The semaphore management circuit is connected to a processor 20.

The semaphore area register 11 stores therein an address of a semaphore register assigned in a memory space. The semaphore register may be implemented as a portion of the memory space provided by a memory device, or may be implemented as a dedicated register logic circuit that is provided in a memory controller or the like. In either case, the semaphore register has an address assigned thereto in the memory space so that it can be accessed. The semaphore area register 11 stores therein this address for the purpose of referring to the semaphore register.

The comparator 12 compares the address stored in the semaphore area register 11 with an address output from the processor 20. When the comparison indicates a match, the comparator 12 supplies a match signal indicative of the match to the semaphore control circuit 13. The processor 20 outputs an address to be accessed when accessing a memory or a semaphore register. The comparator 12 compares this output address with the address of the semaphore register, thereby determining whether the accessed portion is a semaphore register.

The semaphore control circuit 13 receives the match signal from the comparator 12, and also receives a read/write signal RD/WD and a chip select signal CS from the processor 20. When the chip select signal CS is asserted and the match signal is asserted, the semaphore control circuit 13 sets a lock signal LOCK to HIGH in response to the read/write signal RD/WD indicative of a read operation. When the chip select signal CS is asserted and the match signal is asserted, the semaphore control circuit 13 resets the lock signal LOCK to LOW in response to the read/write signal RD/WD indicative of a write operation. This lock signal LOCK is used by the processor 20 to inform other processors that the bus access is made for the purpose of semaphore control. That is, the other processors refer to the lock signal LOCK to determine whether there is an ongoing access operation that accesses the semaphore register.

During the HIGH period of the lock signal LOCK, the other processors ascertain that the semaphore register is being accessed, and thus refrain from referring to and setting the semaphore register.

The bus-arbitration control circuit 14 performs semaphore control and bus arbitration. In a system in which resources such as memories and peripheral devices connected to a bus are shared, there is a need to use the bus on an exclusive basis. Because of this need, it is necessary to grant the right to use the bus to only one processor when a plurality of processors requests the right to use the bus. Bus arbitration is performed for this purpose. When there is a need to access the bus, each processor transmits a bus-arbitration-request signal BREQ. Processors that can let others use the bus assert a bus-arbitration-acknowledge signal BACK in response to the bus-arbitration-request signal BREQ.

Since access for semaphore control is performed through the bus, the right to use the bus cannot be granted to other processors during an ongoing access operation for semaphore control. In the configuration of FIG. 1, therefore, the bus-arbitration control circuit 14 is configured not to assert the bus-arbitration-acknowledge signal BACK in response to the bus-arbitration-request signal BREQ if the lock signal LOCK is HIGH. In detail, when receiving the bus-arbitration-request signal BREQ, the bus-arbitration control circuit 14 asserts the bus-arbitration-acknowledge signal BACK in response to the bus-arbitration-request signal BREQ if the lock signal LOCK is LOW and the chip select signal CS is in a negated state. If the lock signal LOCK is LOW and the chip select signal CS is in an asserted state, the bus-arbitration control circuit 14 does not asserts the bus-arbitration-acknowledge signal BACK since a memory access operation is underway. If the lock signal LOCK is HIGH, the bus-arbitration control circuit 14 does not assert the bus-arbitration-acknowledge signal BACK in response to the bus-arbitration-request signal BREQ regardless of the status of the chip select signal CS.

In this manner, the semaphore management circuit of the present invention compares address signals output from the processor with the semaphore address. If these addresses match, the semaphore management circuit sets the lock signal LOCK to HIGH at the time of a read operation (load operation) directed to the semaphore, and resets the lock signal LOCK to LOW at the time of a write operation (store operation) directed to the semaphore. This lock signal LOCK informs other processors that the bus access made by the processor is a bus access for semaphore control. The other processors refrain from accessing the semaphore if the lock signal LOCK indicates that there is an ongoing access operation directed to the semaphore.

Figure 2:
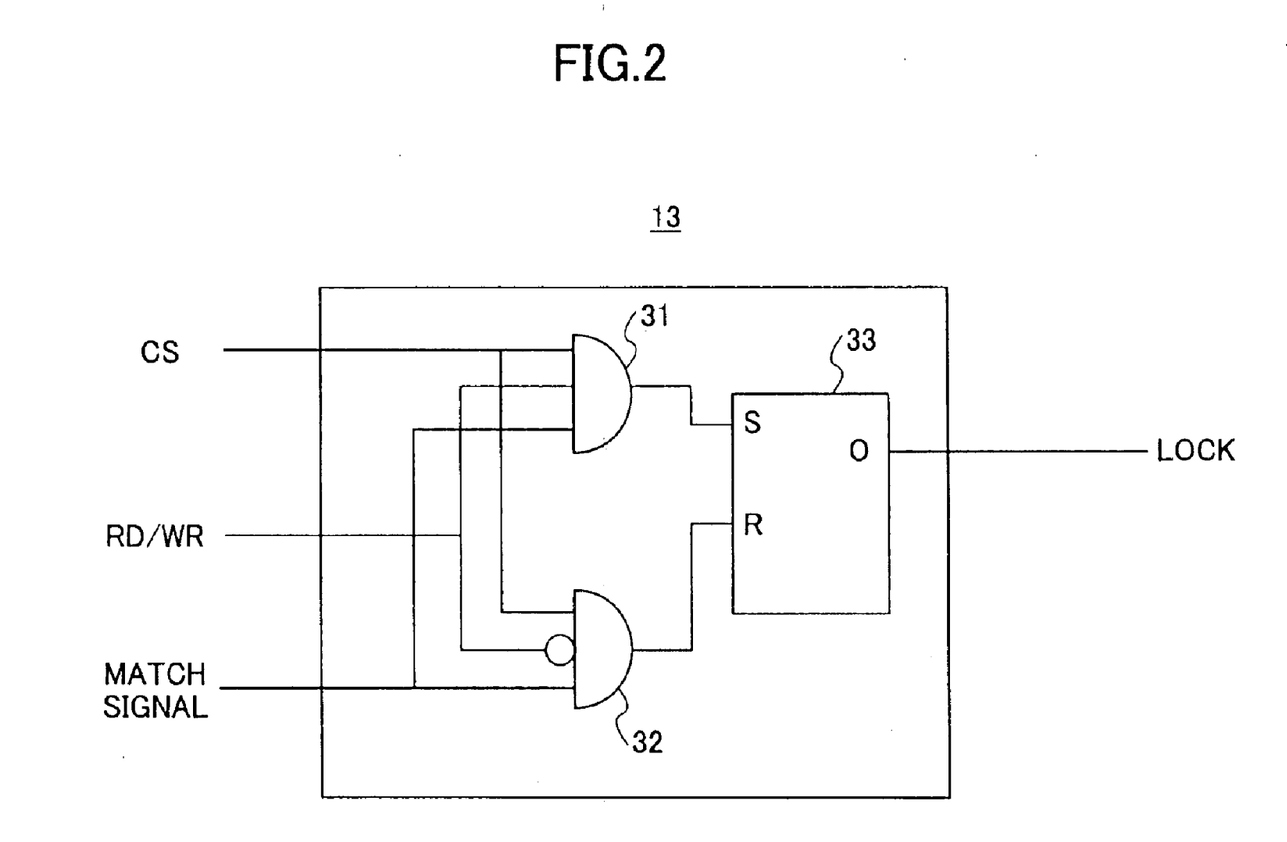
FIG. 2 is an example of a circuit diagram of a semaphore control circuit.

FIG. 2 is an example of a circuit diagram of the semaphore control circuit 13.

The semaphore control circuit 13 of FIG. 2 includes AND circuits 31 and 32 and a flip-flop 33. The AND circuit 31 receives the chip select signal CS, the read/write signal RD/WD, and the match signal, and outputs a HIGH signal when all the incoming signals are HIGH. The HIGH output of the AND circuit 31 sets the flip-flop 33, so that the lock signal LOCK output from the flip-flop 33 is set to HIGH. The AND circuit 32 receives the chip select signal CS, an inverse of the read/write signal RD/WD, and the match signal, and outputs a HIGH signal when all the incoming signals are HIGH. The HIGH output of the AND circuit 32 resets the flip-flop 33, so that the lock signal LOCK output from the flip-flop 33 is reset from HIGH to LOW.

Figure 3:
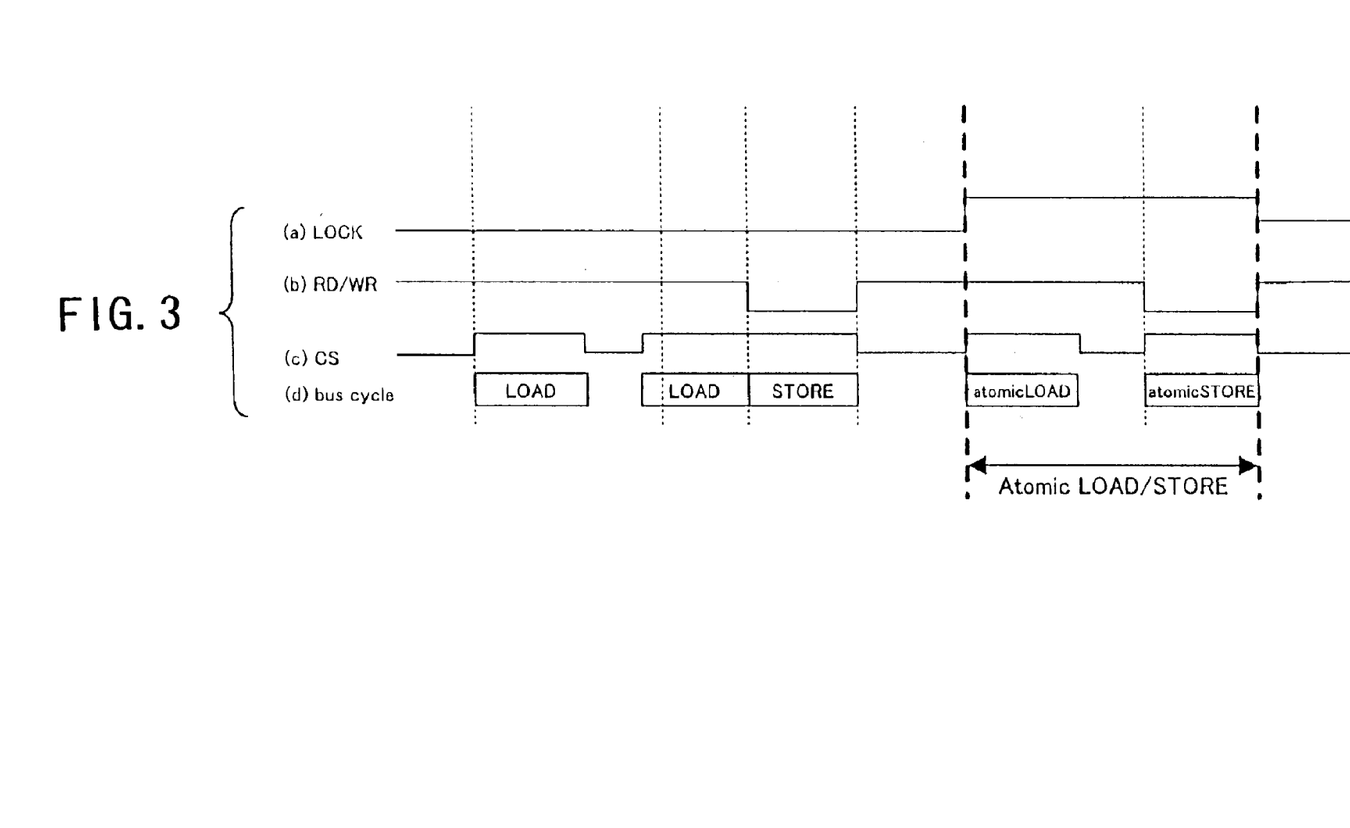
FIG. 3 is a timing chart showing the operation of the semaphore control circuit and a semaphore control operation.

FIG. 3 is a timing chart showing the operation of the semaphore control circuit 13 and a semaphore control operation.

Letter designation (a) shows the lock signal LOCK, and letter designation (b) demonstrates the read/write signal RD/WD. Further, letter designation (c) indicates the chip select signal CS, and letter designation (d) exhibits operations of successive bus cycles. As shown in FIGS. 3-(b) through (d), both the chip select signal CS and the read/write signal RD/WD are HIGH when a read command LOAD for reading a memory is performed. When a write command STORE for writing a memory is performed, the chip select signal CS is HIGH, and the read/write signal RD/WD is LOW.

As shown in FIGS. 3-(a) through (d), when a read command atomicLOAD for reading a semaphore register is performed, both the chip select signal CS and the read/write signal RD/WD are HIGH. Concurrently, the lock signal LOCK output from the semaphore control circuit 13 is set to HIGH. The lock signal LOCK stays HIGH after the completion of the read command atomicLOAD. Thereafter, a write command atomicSTORE for writing in the semaphore register is carried out. At this time, the chip select signal CS becomes HIGH, and the read/write signal RD/WD becomes LOW. The execution of the write command atomicSTORE results in the lock signal LOCK output from the semaphore control circuit 13 being reset from HIGH to LOW. Through the operations described above, other processors are prohibited from accessing the memory from the time the semaphore flag is set until the semaphore flag is reset.

Figure 4:
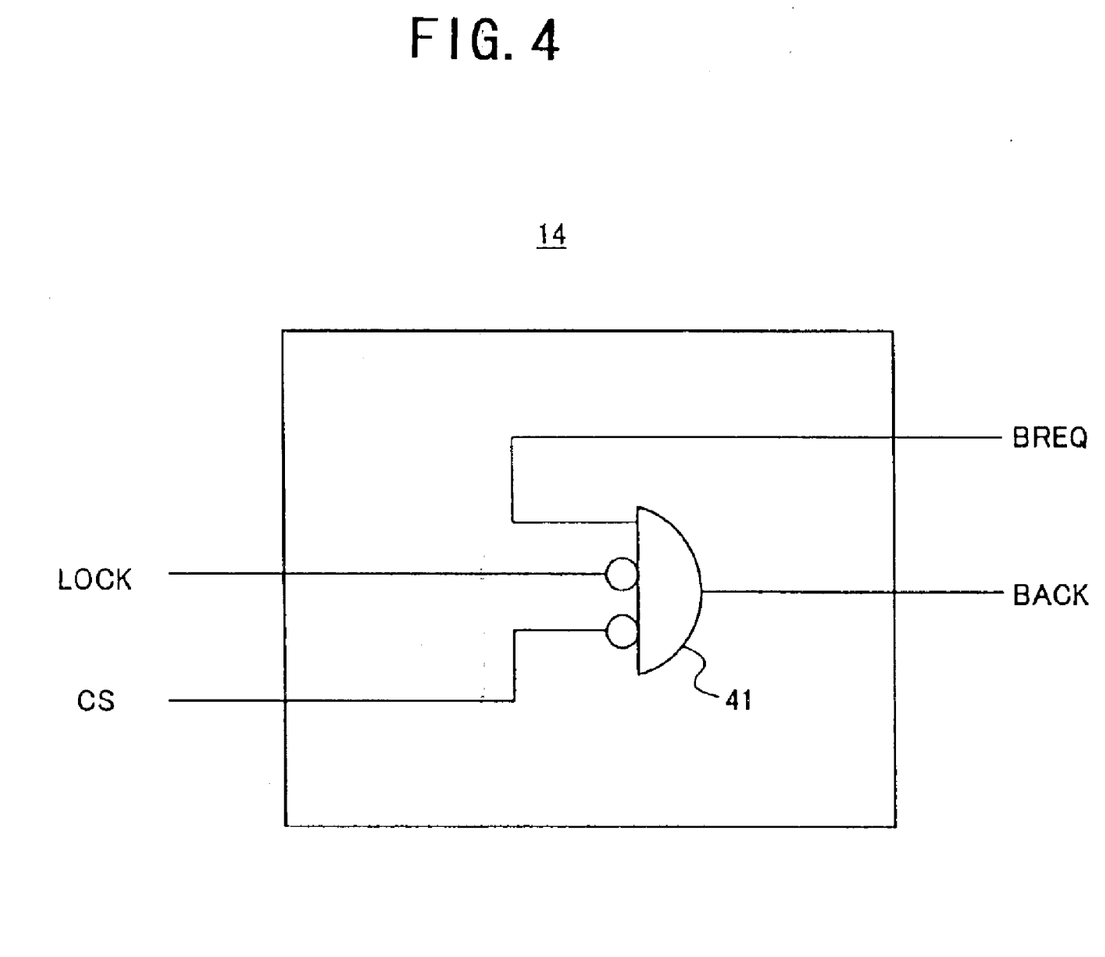
FIG. 4 is a circuit diagram showing an example circuit structure of a bus-arbitration control circuit.

FIG. 4 is a circuit diagram showing an example circuit structure of the bus-arbitration control circuit 14.

The bus-arbitration control circuit 14 of FIG. 4 includes an AND circuit 41. The AND circuit 41 receives the bus-arbitration-request signal BREQ from other processors, and further receives an inverse of the lock signal LOCK supplied from the semaphore control circuit 13 and an inverse of the chip select signal CS supplied from the processor 20. Here, the bus-arbitration-request signal BREQ is supplied to the bus-arbitration control circuit 14 of each processor after obtaining an OR operation among the bus-arbitration-request signals BREQs transmitted from a plurality of processors. Accordingly, when the bus-arbitration-request signal BREQ is asserted in the configuration of FIG. 4, this assertion indicates that any one or more of the processors in the system are requesting the right to access the bus.

When the inverse of the lock signal LOCK supplied from the semaphore control circuit 13 and the inverse of the chip select signal CS supplied from the processor 20 are both HIGH, the AND circuit 41 asserts the bus-arbitration-acknowledge signal BACK in response to the assertion of the bus-arbitration-request signal BREQ. Accordingly, the right to use the bus is given to others in response to the request for the bus right if no semaphore register access operation is underway and if no memory access is underway. If there is an ongoing semaphore register access or an ongoing memory access, on the other hand, the right to use the bus is not given to others even when the request for the bus right is made.

Figure 5:
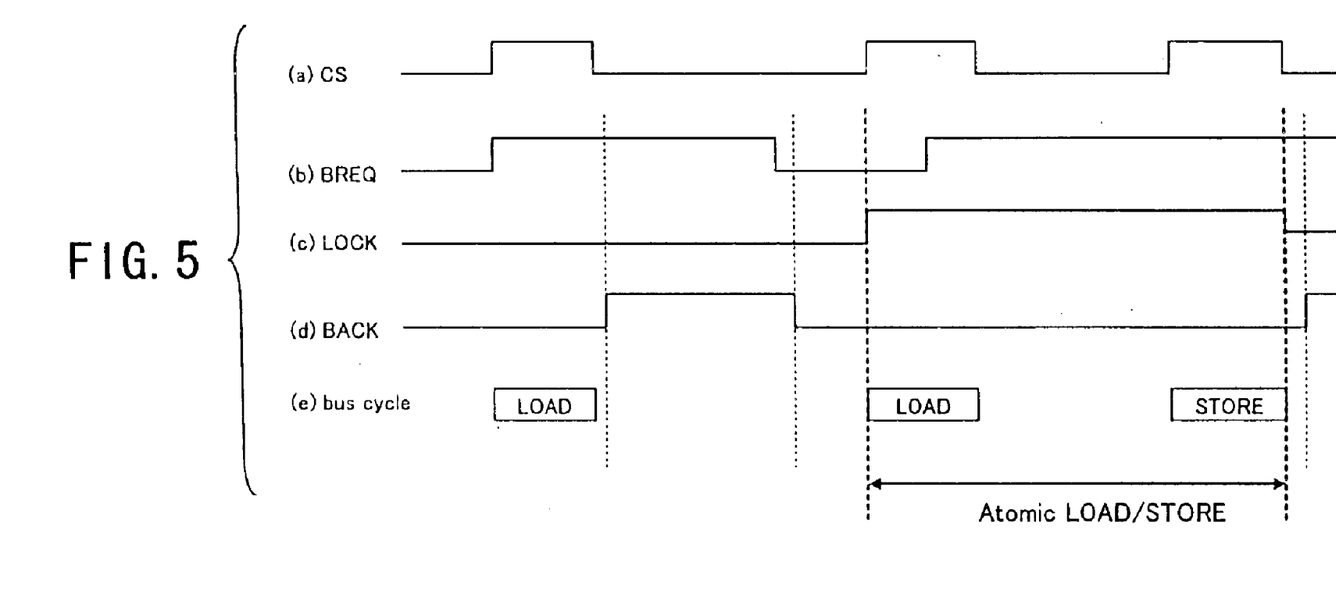
FIG. 5 is a timing chart showing the operation of the bus-arbitration control circuit and a semaphore control operation.

FIG. 5 is a timing chart showing the operation of the bus-arbitration control circuit 14 and a semaphore control operation.

Letter designation (a) shows the chip select signal CS, and letter designation (b) demonstrates the bus-arbitration-request signal BREQ. Further, letter designation (c) indicates the lock signal LOCK, and letter designation (d) exhibits the bus-arbitration-acknowledge signal BACK. Letter designation (e) shows operations of successive bus cycles. The bus-arbitration-request signal BREQ shown in (b) is supplied from other processors.

As shown in FIGS. 5-(a) and (e), the chip select signal CS is HIGH when a read command LOAD for reading a memory is performed. Even when other processors assert the bus-arbitration-request signal BREQ during this period, the bus-arbitration-acknowledge signal BACK is not asserted as shown in FIGS. 5-(b) and (d) since the chip select signal CS is HIGH to indicate the presence of an ongoing memory read operation.

As shown in FIGS. 5-(a), (c), and (e), when a read command atomicLOAD for reading a semaphore register is performed, both the chip select signal CS and the lock signal LOCK are set to HIGH. The lock signal LOCK stays HIGH after the completion of the read command atomicLOAD. Even when other processors assert the bus-arbitration-request signal BREQ during this period, the bus-arbitration-acknowledge signal BACK is not asserted as shown in FIGS. 5-(b) and (d) since the lock signal LOCK is HIGH to indicate the presence of an ongoing semaphore access. Thereafter, a write command atomicSTORE for writing in the semaphore register is carried out. The execution of the write command atomicSTORE results in the lock signal LOCK being reset from HIGH to LOW. Since the bus-arbitration-request signal BREQ stays in an asserted state, as shown in FIGS. 5-(b) and (d), the bus-arbitration-acknowledge signal BACK is asserted as the lock signal LOCK returns to LOW.

Through the operations as described above, the semaphore management circuit of the present invention does not let others have the bus right in response to a bus-arbitration request when access to the semaphore register is being made for the purpose of semaphore control, and lets others have the bus right after the access to the semaphore register is completed. Another processor that receives the bus right thereafter can access the bus for the purpose of using resources such as peripheral devices.

Figure 6:
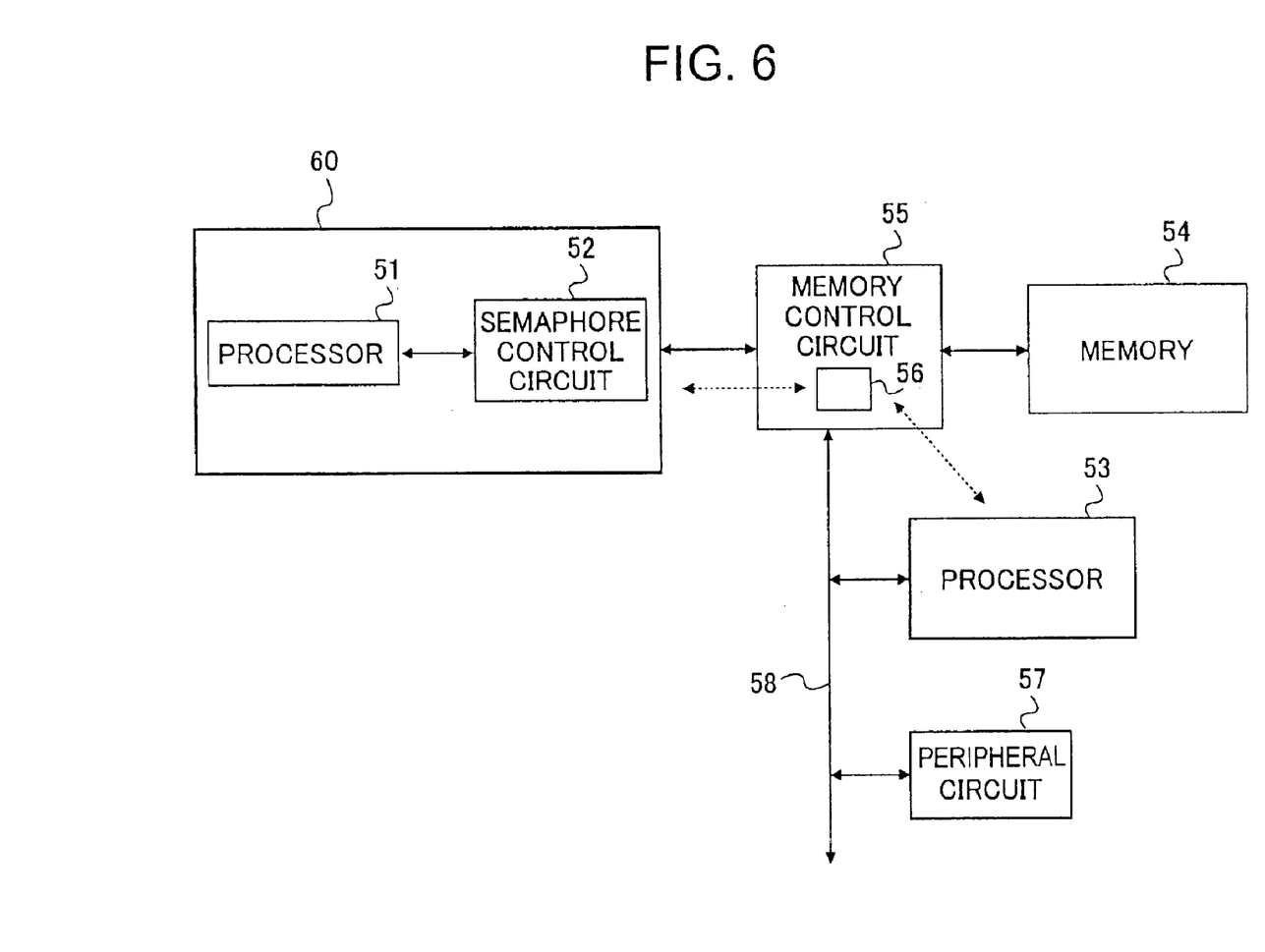
FIG. 6 is a block diagram showing an example of a multi-processor system to which the semaphore management circuit is applied according to the present invention.

FIG. 6 is a block diagram showing an example of a multi-processor system to which the semaphore management circuit is applied according to the present invention.

The multi-processor system of FIG. 6 includes a processor 51, a semaphore management circuit 52 of the present invention, a processor 53, a memory 54, a memory control circuit 55, a peripheral circuit 57, and a bus 58. The semaphore management circuit 52 is associated with the processor 51, and the processor 51 combined with the semaphore management circuit 52 may be provided as a single unit as a processor 60. In this case, the processor 51 can be implemented based on a design for general processors that are not specifically designed for use in a multi-processor-system environment. Provision of the semaphore management circuit 52 to the processor 51 makes it possible to use the processor 60 that is capable of performing a function similar to the atomic-LOAD/STORE function.

The processor 53 may be specifically designed for use in a multi-processor-system environment, and may be provided with the atomicLOAD/STORE function, for example. The memory control circuit 55 is equipped with a semaphore flag 56. The processor 60 and the processor 53 each control the semaphore flag 56 separately to obtain the right to exclusively use the memory 54. The processor 53 is connected to the peripheral circuit 57 via the bus 58.

When the processor 60 needs to use the memory 54 on an exclusive basis, the processor 60 refers to the semaphore flag 56 first. In conjunction with this, the semaphore management circuit 52 sets the lock signal LOCK to HIGH, thereby informing other processors (i.e., the processor 53 in this example) that this bus access is made for the purpose of semaphore control. While the lock signal LOCK is HIGH, the processor 53 does not access the semaphore flag 56. Having detected that the flag is not set by checking the semaphore flag 56, the processor 60 carries out a STORE operation for setting the semaphore flag 56. After the completion of the STORE operation, the lock signal LOCK is returned to LOW. When the processor 53 thereafter refers to the semaphore flag 56, the processor 53 finds that the flag is set to indicate the ongoing exclusive use of the memory 54, and thus postpones memory access until the semaphore flag is reset. Even in such a case, the processor 53 can obtain the right to use the bus if the bus 58 is not in use, thereby accessing the peripheral circuit 57, for example.

In this manner, the multi-processor system based on the use of the semaphore management circuit 52 of the present invention achieves strict semaphore control even though an ordinary processor 51 having no atomic-LOAD/STORE function is employed. This makes it possible to readily implement a multi-processor system by use of the ordinary processor 51.

Further, the present invention is not limited to these embodiments, but various variations and modifications may be made without departing from the scope of the present invention.

The present application is based on Japanese priority application No. 2001-239513 filed on Aug. 7, 2001, with the Japanese Patent Office, the entire contents of which are hereby incorporated by reference.

What is claimed is:

1. A circuit, comprising:

a register which stores therein a semaphore address;

a semaphore control circuit which asserts a control signal in response to a read access by a processor directed to the semaphore address, and negates the control signal in response to a write access by the processor directed to the semaphore address, and a bus-arbitration control circuit which receives a signal indicative of a bus-arbitration request, the control signal, and a chip enable signal output from the processor, and wherein other resources are prohibited from accessing the semaphore address when the control signal is asserted, and a right to use a bus given to the processor is not relinquished in response to the bus-arbitration request supplied from an external source during an asserted state of the control signal, and said bus-arbitration control circuit operating not to assert a bus-arbitration-acknowledge signal in response to the bus-arbitration request signal regardless of a state of the chip enable signal when the control signal is in the asserted state, operating not to assert the bus-arbitration-acknowledge signal in response to the bus-arbitration request signal when the chip enable signal is in an asserted state and the control signal is in a negated state, and operating to assert the bus-arbitration-acknowledge signal in response to the bus-arbitration request signal when the chip enable signal is in a negated state and the control signal is in the negated state.

2. The circuit as claimed in claim 1, further comprising a comparator which makes a comparison of an address output from the processor with the semaphore address stored in said register, and asserts a match signal when the comparison indicates a match, wherein said semaphore control circuit includes:

a circuit which sets the control signal to an asserted state in response to assertion of the match signal and an indication of a read operation by a read/write signal output from the processor; and a circuit which resets the control signal to a negated state in response to the assertion of the match signal and an indication of a write operation by the read/write signal output from the processor.

3. A processor, comprising:

a processor core;

a register which stores therein a semaphore address;

a control circuit which asserts a control signal in response to a read access by said processor core directed to the semaphore address, and negates the control signal in response to a write access by said processor core directed to the semaphore address, and a bus-arbitration control circuit which receives a signal indicative of a bus-arbitration request, the control signal, and a chip enable signal output from the processor, and wherein other resources are prohibited from accessing the semaphore address when the control signal is asserted, and a right to use a bus given to the processor is not relinquished in response to the bus-arbitration request supplied from an external source during an asserted state of the control signal, and said bus-arbitration control circuit operating not to assert a bus-arbitration-acknowledge signal in response to the bus-arbitration request signal regardless of a state of the chip enable signal when the control signal is in the asserted state, operating not to assert the bus-arbitration-acknowledge signal in response to the bus-arbitration request signal when the chip enable signal is in an asserted state and the control signal is in a negated state, and operating to assert the bus-arbitration-acknowledge signal in response to the bus-arbitration request signal when the chip enable signal is in a negated state and the control signal is in the negated state.

4. The processor as claimed in claim 3, wherein said control circuit includes:

a comparator which makes a comparison of an address output from said processor core with the semaphore address stored in said register, and asserts a match signal when the comparison indicates a match;

a circuit which sets the control signal to an asserted state in response to assertion of the match signal and an indication of a read operation by a read/write signal output from said processor core; and a circuit which resets the control signal to a negated state in response to the assertion of the match signal and an indication of a write operation by the read/write signal output from said processor core.

5. A multi-processor system, comprising:
a plurality of processors;
a memory shared by said plurality of processors;
a semaphore register for controlling exclusive use of said memory, wherein at least one of said plurality of processors includes:
a processor core;
an address register which stores therein an address of said semaphore register; and
a control circuit which asserts a control signal in response to a read access by said processor core directed to the address stored in said address register, and negates the control signal in response to a write access by said processor core directed to the address stored in said address resister; and
a bus-arbitration control circuit which receives a signal indicative of a bus-arbitration request, the control signal, and a chip enable signal output from the processor, and
wherein other resources are prohibited from accessing the semaphore address when the control signal is asserted, and a right to use a bus given to the processor is not relinquished in response to the bus-arbitration request supplied from an external source during an asserted state of the control signal, and
said bus-arbitration control circuit operating not to assert a bus-arbitration-acknowledge signal in response to the bus-arbitration request signal regardless of a state of the chip enable signal when the control signal is in the asserted state, operating not to assert the bus-arbitration-acknowledge signal in response to the bus-arbitration request signal when the chip enable signal is in an asserted state and the control signal is in a negated state, and operating to assert the bus-arbitration-acknowledge signal in response to the bus-arbitration request signal when the chip enable signal is in a negated stafe and the control signal is in the negated state.

6. The multi-processor system as claimed in claim 5, wherein said control circuit includes:
a comparator which makes a comparison of an address output from said processor core with the semaphore address stored in said address register, and asserts a match signal when the comparison indicates a match;
a circuit which sets the control signal to an asserted state in response to assertion of the match signal and an indication of a read operation by a read/write signal output from said processor core; and
a circuit which resets the control signal to a negated state in response to the assertion of the match signal and an indication of a write operation by the read/write signal output from said processor core.

7. A method for controlling a semaphore in a system including at least one processor and a bus-arbitration control circuit, comprising: asserting a control signal when the processor performs a read access to a semaphore address;
said bus-arbitration control circuit receiving a signal indicative of a bus-arbitration request, the control signal, and a chip enable signal output from the processor;
negating the control signal when the processor performs a write access to the semaphore address, and a right to use a bus give to the processor is not relinquished in response to the bus arbitration request supplied from an external source during an asserted state of the control signal; and
said bus-arbitration control circuit operating not to assert a bus-arbitration-acknowledge signal in response to the bus-arbitration request signal regardless of a state of the chip enable signal when the control signal is in the asserted state, operating not to assert the bus-arbitration-acknowledge signal in response to the bus-arbitration request signal when the chip enable signal is in an asserted state and the control signal is in a negated state, and operating to assert the bus-arbitration-acknowledge signal in response to the bus-arbitration request signal when the chip enable signal is in a negated state and the control signal is in the negated state.

8. A circuit, comprising:
a register storing a semaphore address;
a bus-arbitration control circuit which receives a signal indicative of a bus-arbitration request, the control signal, and a chip enable signal output from the processor;
a semaphore control circuit which asserts a control signal in response to a read access by a processor directed to the semaphore address, and negates the control signal in response to a write access by the processor directed to the semaphore address, the control signal preventing other processors from accessing the semaphore address, and a right to use a bus given to the processor is not relinquished in response to a bus-arbitration request supplied from an external source during an asserted state of the control signal, and
where said bus-arbitration control circuit operating not to assert a bus-arbitration-acknowledge signal in response to the bus-arbitration request signal regardless of a state of the chip enable signal when the control signal is in the asserted state, operating not to assert the bus-arbitration-acknowledge signal in response to the bus-arbitration request signal when the chip enable signal is in an asserted state and the control signal is in a negated state, and operating to assert the bus-arbitration-acknowledge signal in response to the bus-arbitration request signal when the chip enable signal is in a negated state and the control signal is in the negated state.

* * * * *

UNITED STATES PATENT AND TRADEMARK OFFICE
CERTIFICATE OF CORRECTION

PATENT NO. : 6,839,811 B2
DATED : January 4, 2005
INVENTOR(S) : Hiroyuki Fujiyama It is certified that error appears in the above-identified patent and that said Letters Patent is hereby corrected as shown below:

Column 9,
Line 15, change "resister" to -- register --
Line 37, change "stafe" to -- state --

Column 10,
Line 1, after "comprising:" insert paragraph return
Line 9, change "give" to -- given --
Line 10, change "bus arbitration" to -- bus-arbitration --

Signed and Sealed this

Thirty-first Day of May, 2005

JON W. DUDAS
*Director of the United States Patent and Trademark Office*